No. 673,538. Patented May 7, 1901.
F. HEWER.
ELECTRIC RAILWAY CONDUIT.
(Application filed June 12, 1900.)
(No Model.) 4 Sheets—Sheet 1.
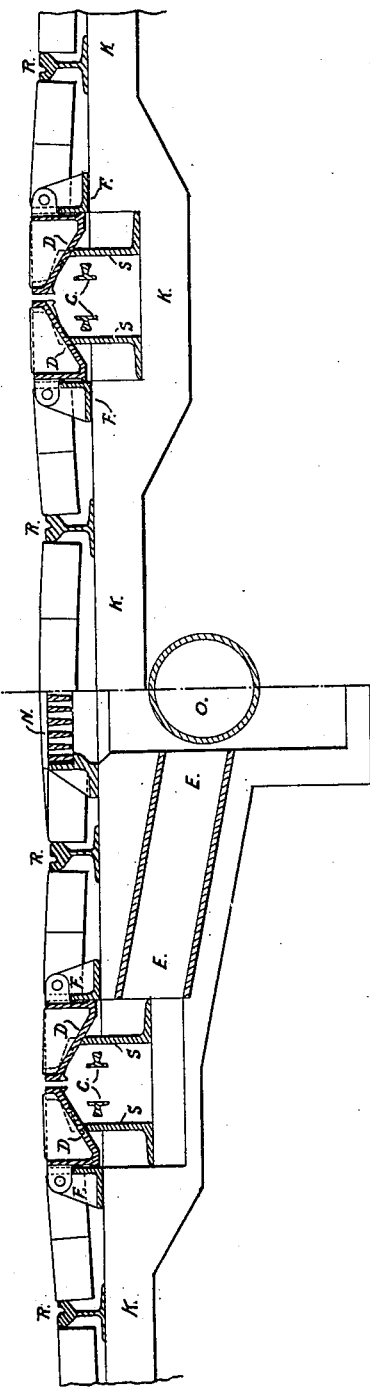
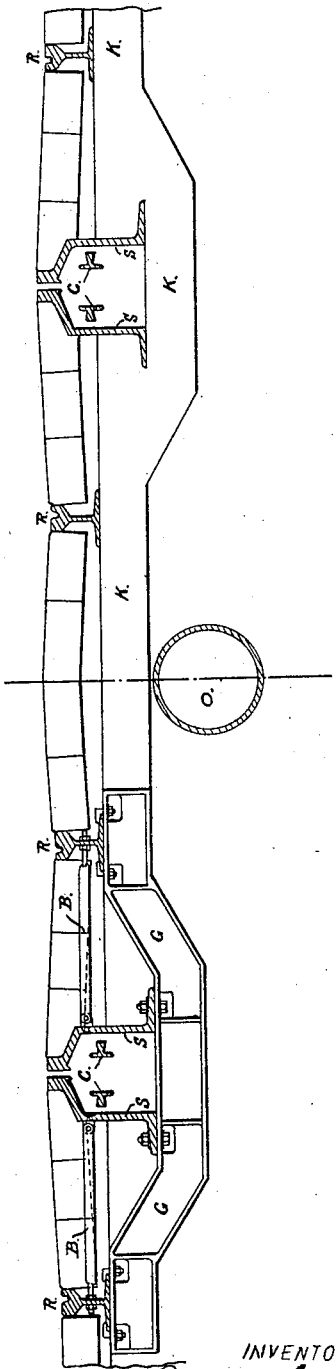
WITNESSES:
Ella L. Giles
Otto Munk
INVENTOR
Frank Hewer
BY
Richardson
ATTORNEYS No. 673,538. Patented May 7, 1901.
F. HEWER.
ELECTRIC RAILWAY CONDUIT.
(Application filed June 12, 1900.)
(No Model.) 4 Sheets—Sheet 2.
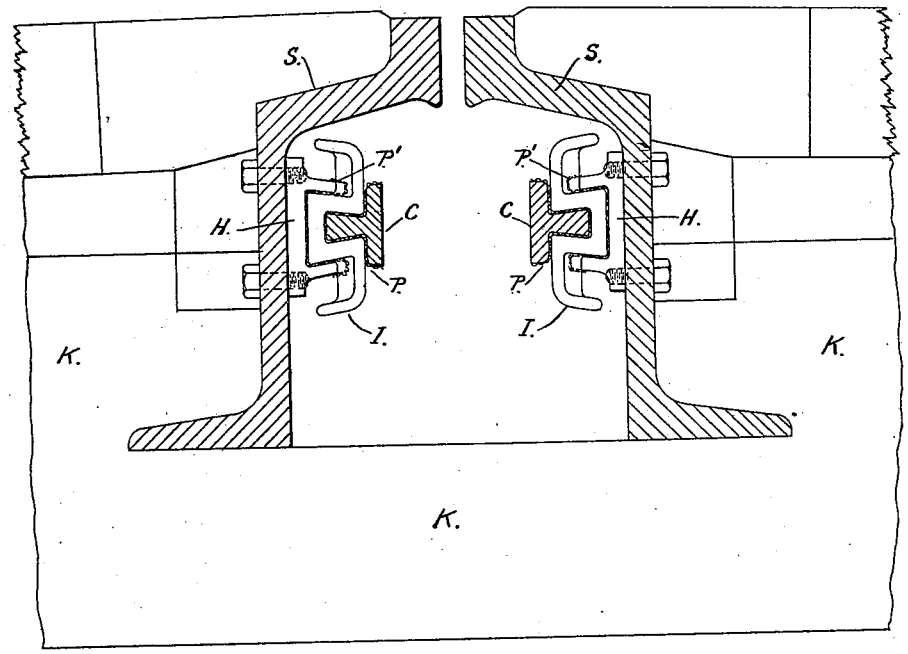
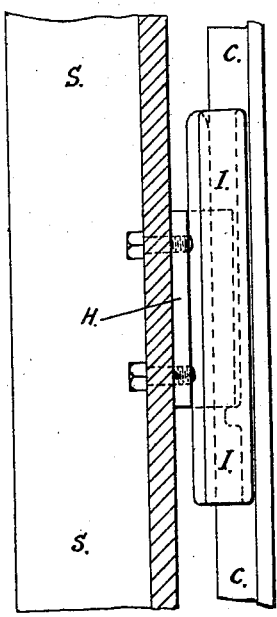
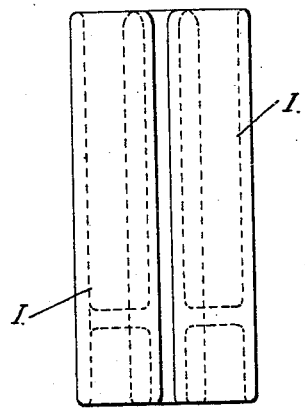
WITNESSES:
Ella L. Giles
Otto Munk
INVENTOR
Frank Hewer
BY
Richard
ATTORNEYS No. 673,538.   Patented May 7, 1901.
F. HEWER.
ELECTRIC RAILWAY CONDUIT.
(Application filed June 12, 1900.)
(No Model.)   4 Sheets—Sheet 3.

WITNESSES:
Ella L. Giles
Otto Minck

INVENTOR
Frank Hewer
BY
Richards
ATTORNEYS

No. 673,538. Patented May 7, 1901.
F. HEWER.
ELECTRIC RAILWAY CONDUIT.
(Application filed June 12, 1900.)
(No Model.) 4 Sheets—Sheet 4.

WITNESSES:
Ella L. Giles
Otto Munk

INVENTOR
Frank Hewer
BY Richardson
ATTORNEYS

UNITED STATES PATENT OFFICE.

FRANK HEWER, OF CHISWICK, ENGLAND.

ELECTRIC-RAILWAY CONDUIT.

SPECIFICATION forming part of Letters Patent No. 673,538, dated May 7, 1901.

Application filed June 12, 1900. Serial No. 20,001. (No model.)

*To all whom it may concern:*

Be it known that I, FRANK HEWER, a subject of the Queen of Great Britain, residing at 36 Thornton avenue, Chiswick, in the county of Middlesex, England, have invented certain new and useful Improvements in Electric Tramways or Railways on the Slotted-Conduit System, (patented in Great Britain, No. 22,989, bearing date November 18, 1899,) of which the following is a specification.

The objects of my invention are, first, to construct a slotted conduit for the reception of a conductor or conductors for the use of electric tramways or railways which can be rapidly laid and which does not necessitate a deep excavation, thus avoiding undue disturbance of the streets or interference with existing water, gas, or other mains; second, to construct a slotted conduit that can easily be cleaned and drained; third, to construct a slotted conduit for the reception of a conductor or conductors for electric tramways or railways in such a manner that the conductors and the insulators which carry the said conductors can be easily removed for cleaning or renewal; fourth, to construct a holder for the insulator which will allow the insulator to be withdrawn for cleaning or renewal without displacing or disturbing the continuity of the conductor; fifth, to construct a holder for the insulator in such a manner that the insulator is protected from damage due to strains on the conductor or due to expansion or contraction of the said conductor, and, sixth, to construct an insulator of high insulation and at the same time capable of removal without displacing or disturbing the holder or conductor.

Figure 8:
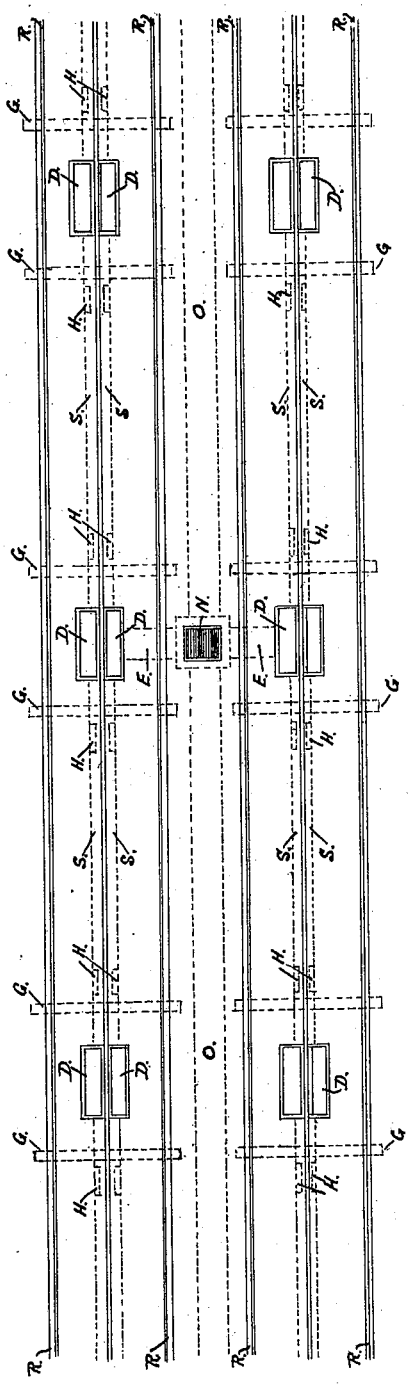
Figure 9:
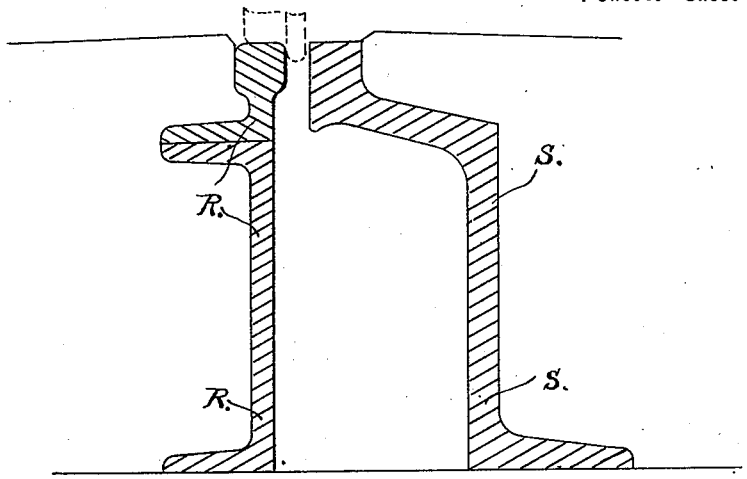
Figure 10:
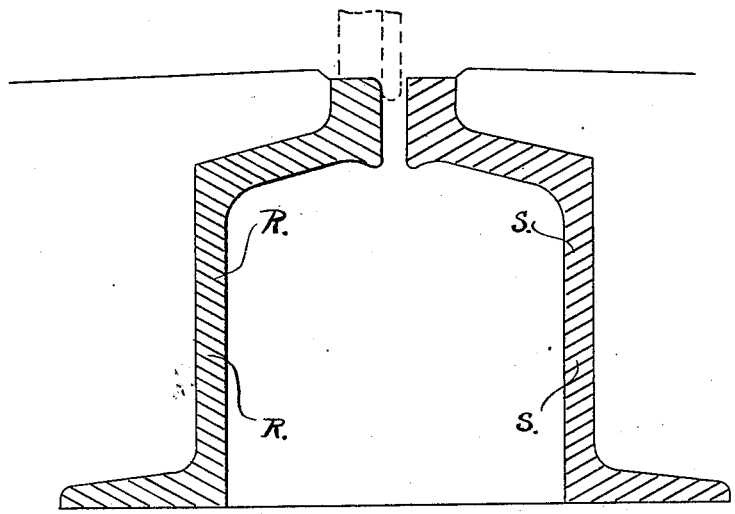

Referring to the drawings, which form a part of this specification, Figures 1, 2, 3, and 4 are half-sections of a double track. Fig. 1 shows the access-doors and one method of draining the conduit and road. Fig. 2 shows the access-doors. Fig. 3 shows the method of tying the sides of the conduit to the tram-rails by means of a girder and tie-bars. Fig. 4 shows the construction of the conduit and the track between the aforesaid access-doors and girders. Figs. 5 and 6 show the method of insulating the conductors. Figs. 6 and 7 also show the construction of the insulator. Fig. 8 is a plan of a double track, showing the disposition of access-doors, girders, and insulators. Figs. 9 and 10 show the construction of the conduit when the tram-rail is used to form one side of the conduit.

The sides of the conduit S S are of iron or steel divided into sections of suitable length and may be coated internally with a composition to prevent condensation of moisture. Between each section is placed an iron frame F F, securely bolted to the ends of the section and containing access-doors D D. (See Figs. 1, 2, and 8.) The insulator-holders H H are fixed to the two sides S S at convenient distances from the access-doors D D. (See Fig. 8.) The sections S S are set in concrete or other suitable material K K, which forms the bottom of the conduit. The sections S S are tied to the tram-rails R R by the bars B B and girders G G, substantially as shown in Figs. 3 and 8.

The top of the sides S S is preferably kept above the level of the tram-rails R R, so that the surface-water drains away from the slot toward the sides of the road. In the case of a double track gratings N can be provided to drain the center of the road into a sewer, which is placed in any convenient position. (Shown in Figs. 1 and 8.) At convenient distances drain-pipes E E are placed, preferably under the access-doors D D, to drain the conduit into the sewer or any other convenient place. (See Figs. 1 and 8.)

The holders H H are preferably provided with the spring packing or buffer P P, and at the insulating-points the conductors C C are also preferably provided with a spring packing or buffer P P, so that the insulator I I is protected and held in position by a flexible connection between the conductors C C and holder H H, as shown in Fig. 5. By this means the insulator L L can be easily withdrawn at the access-doors D D for cleaning or renewal without disturbing the holder or conductor.

The insulator is made to extend a considerable distance beyond the holder H H, as shown in Figs. 5, 6, and 7, affording, therefore, a large surface to prevent leakage to earth. This and the ease with which the insulator can be cleaned insures permanently a very high insulation.

The conductor C C is made up of sections, any one of which can be easily removed through the access-doors D D. These sections may be electrically connected together or bonded in such a manner as to allow any section to be cut out of the circuit but still offer a uniform surface to the collector.

The conduit may be constructed as shown in Figs. 9 and 10. Here the tram-rail R R forms one side of the conduit, the other side being made up of iron or steel sections S S, provided with tie-bars, girders, and access-doors, substantially as before described.

Having now described my invention, what I claim as new, and desire to secure by Letters Patent, is—

1. In an electric-railway conduit the combination of pairs of specially-formed rolled steel or iron ⌐ or ⌐ shaped sections S S of suitable length, the webs forming the sides of the conduit and the top flanges forming the top of the conduit, the webs having insulator-holders H H fixed at convenient distances apart and provided with horizontal grooves or recesses lined with packing to hold the insulators; insulators I I which slide into the recesses of the holders H H and the conductors C C which are formed in sections and provided with packing-pieces P P, said insulators sliding over projections on the conductors all substantially as described.

2. In an electric-railway conduit the combination of pairs of specially-formed rolled steel or iron ⌐ or ⌐ shaped sections S S of suitable length, the webs forming the sides of the conduit and the top flanges forming the top of the conduit, the webs having insulator-holders H H fixed at convenient distances apart and provided with horizontal grooves or recesses lined with packing to hold the insulators; insulators I I which slide into the recesses of the holders H H and the conductors C C which are formed in sections and provided with packing-pieces P P; said insulators sliding over projections on said conductors, a concrete bed K K having steel or iron sleepers set in same having a depressed central portion to which the ⌐ or ⌐ shaped bars are securely bolted and raised ends to which the rails R R, which are tied to the sides of the conduit S S, are securely fastened, the depressed central portion of said sleepers together with the concrete bed forming the bottom of the conduit, all substantially as described.

3. In an electric-railway conduit the combination of pairs of specially-formed rolled steel or iron ⌐ or ⌐ shaped sections S S of suitable length, the webs forming the sides of the conduit and the top flanges forming the top of the conduit, the webs having insulator-holders H H fixed at convenient distances apart and provided with horizontal grooves or recesses lined with packing to hold the insulators; insulators I I which slide into the recesses of the holders H H and the conductors C C which are formed in sections and provided with packing-pieces P P; said insulators sliding over projections on the conductors, a concrete bed K K having steel or iron sleepers set in same and having a depressed central portion to which the ⌐ or ⌐ shaped bars are securely bolted and raised ends to which the rails R R, which are tied to the sides of the conduit S S, are securely fastened, the depressed central portion of said sleepers together with the concrete forming the bottom of the conduit; and iron frames F F interposed between each section of the conduit formed by the bars S S and securely bolted thereto and forming the sides of the conduit, in the intervals between the ends of each section, steel or iron hinged doors carried by these frames forming the top of the conduit and when closed completing the continuity of the road-surface and the conduit, all substantially as described.

4. In an electric-railway conduit the combination of a steel or iron bar S of suitable length, insulator-holders H, insulators I, conductors C, sleepers G which together with the concrete bed form the bottom of the conduit, frames F, and doors D, with the track-rail R forming one side of the conduit as described.

In witness whereof I have hereunto set my hand in presence of two witnesses.

FRANK HEWER.

Witnesses:
  ARTHUR BERTRAM RIGBY,
  WILLIAM RICHARD THOMAS COTTRELL.